United States Patent
Gilmour

[15] 3,696,675
[45] Oct. 10, 1972

[54] METHOD AND MEANS FOR DETERMINING LIQUID LEVEL IN A CONTAINER

[72] Inventor: A. Scott Gilmour, Williamsville, N.Y.

[73] Assignee: Tech-nomedic Corporation, Buffalo, N.Y.

[22] Filed: Sept. 20, 1971

[21] Appl. No.: 181,977

[52] U.S. Cl.................73/295, 73/356, 116/114 V, 116/118
[51] Int. Cl..............................................G01f 23/22
[58] Field of Search.....73/295, 356; 116/118, 114 V; 252/408

[56] References Cited

UNITED STATES PATENTS

| | | | |
|---|---|---|---|
| 3,533,399 | 10/1970 | Goldberg | 252/408 |
| 3,479,875 | 11/1969 | Riddle | 73/295 |
| 3,617,374 | 11/1971 | Hodson | 73/356 |

*Primary Examiner*—S. Clement Swisher
*Attorney*—E. Herbert Liss

[57] ABSTRACT

Apparatus and a method for externally determining the level of a mass of flowable material such as liquid or granular material contained in a closed or sealed container includes an elongated strip of material coated or imbedded with cholesteric liquid crystals which vary chromatically with variations in temperature. The elongated strip is applied to the outer surface of the wall of the container in heat conducting relationship thereto and extends along the height of the container. The container is exposed to a temperature change either natural, such as that which occurs at sunset and sunrise, artificially induced, such as dousing with water at a temperature different from the ambient temperature of the container or by energizing a heater element at the wall of the container adjacent the elongated strip. Because of the difference in the rate of heat conduction of the void volume and the filled space of the container, the container wall experiences a temperature gradient which is most pronounced at the interface of the contents. The temperature of the container wall changes abruptly at the surface of the contents. This change in temperature is readily discernible visually because of the abrupt change in color of the elongated strip at the material interface thus permitting an observer to readily detect the level of the contents in the container.

12 Claims, 4 Drawing Figures

PATENTED OCT 10 1972

INVENTOR.
A. SCOTT GILMOUR
BY
E. Herbert Liss
ATTORNEY.

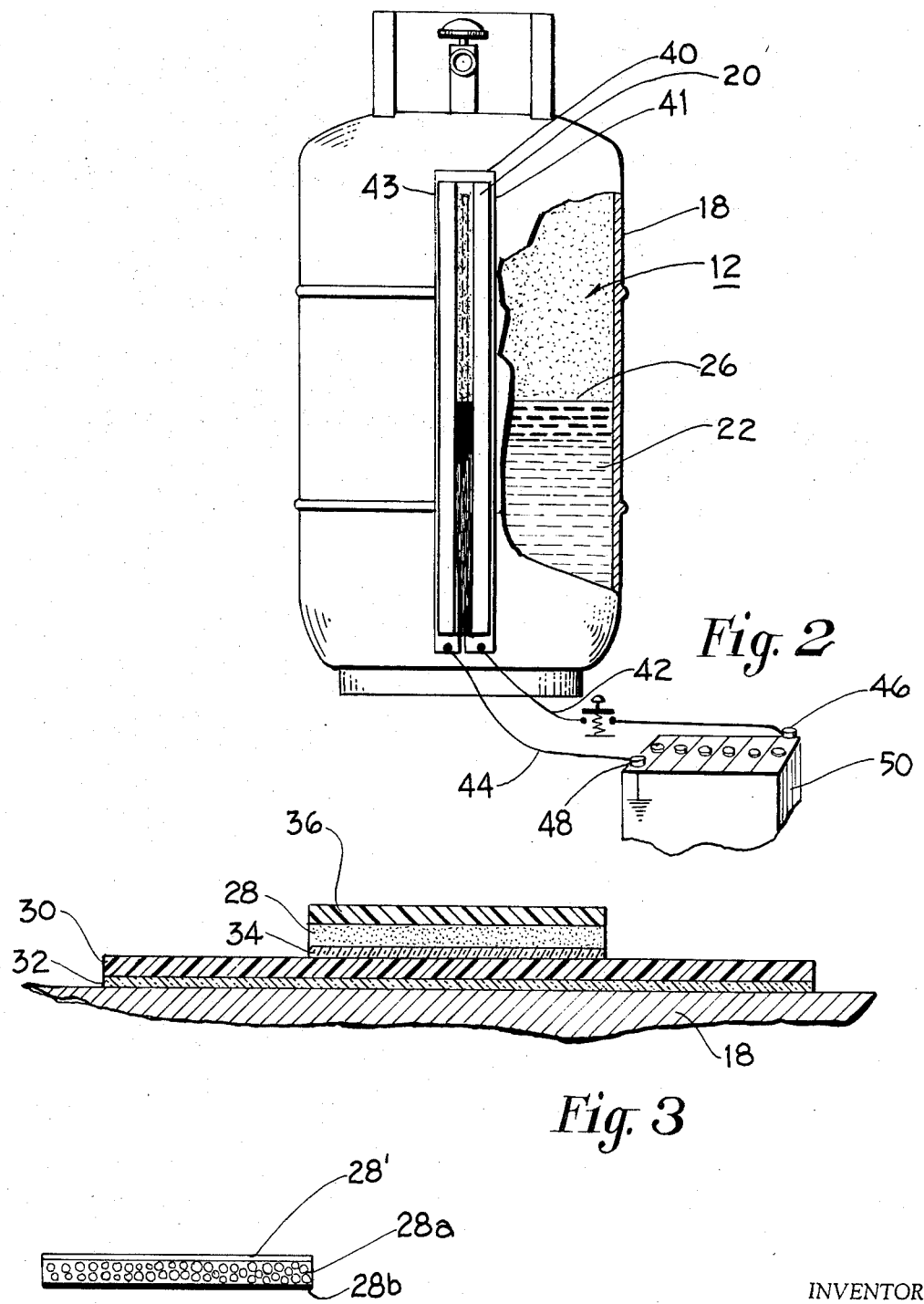

METHOD AND MEANS FOR DETERMINING LIQUID LEVEL IN A CONTAINER

BACKGROUND OF THE INVENTION

The present invention relates to apparatus and a method for externally measuring the level of liquid or flowable granular material in a closed or sealed container.

The problems presented by such measurement are particularly apparent in the measurement of the level of liquid gases such as propane or butane stored in tanks under pressure making difficult and expensive the use of floats or probes. Difficulty in determining liquid level also occurs when containers contain a corrosive liquid precluding use of internal measuring apparatus.

The prior art includes various means which are expensive, require alteration of the container and also require auxiliary equipment not readily adaptable to portability. Among the presently known methods for measuring liquid level in a closed container are tubular transparent sight-glass level gauges which require alteration of the container and introduce sealing problems. Another known method is the provision of a heater element at the container wall with a track mounted thermocouple which is provided with a motor to move the thermocouple on its track. The thermocouple detects the circumferential temperature gradient which changes abruptly at the liquid interface. Such a device is more fully described in U.S. Pat. No. 3,161,050. This last mentioned system required substantial auxiliary equipment and electrical circuitry.

SUMMARY OF THE INVENTION

The invention comprises a method and article of manufacture for externally determining the level of fluidic material in a closed container. An elongate strip coated or imbedded with a thermochromatic substance, preferably reversible or thermotropic, may be applied in heat conducting relationship to the external surface of the container wall. Cholesteric liquid crystal compounds on a dark background are particularly suitable. Cholesteric liquid crystal compounds behave mechanically like liquids but exhibit the optical properties of crystals. They exhibit vivid color changes with slight changes in temperature in a temperature range which is a function of the particular compound selected. The dark background absorbs any light transmitted through the liquid crystal coating and allows the selectively reflected light determined by change in crystal orientation in response to temperature to be observed without light interference. Blue colors are associated with warmer temperatures and red colors with cooler temperatures. In the presence of white light cholesterics selectively reflect one wave length of light at each angle of reflection. The pattern is reversible; the colors will change and reappear as the temperature changes back and forth through a particular range. These chromatic responses occur in the mesophase between that of a crystalline solid and an isotropic or ordinary liquid. This mesophase is referred to as the mesomorphic range or the color-play region of the compound. Thus cholesteric compounds are thermochromatic and thermotropic.

Depending upon the particular compound selected, changes from violet to red can occur in a range of 2° C. or in a broad range of 150° C. within an overall range of −20° C. to 250° C. Response time may be as low as 0.2 secs.

One example of a cholesteric ester suitable for use in a liquid level gauge is Cholesteryl Oleate which has a mesomorphic range of 90° F. to 147° F. Another example is cholesteryl oleyl carbonate having a mesomorphic range of 84.6° F. to 102.6° F.

A temperature change may be induced on the surface of the wall of the container in the region where the level gauge is secured by applying heated or chilled water, by utilizing an electrical heating element or by exposing the container to rapidly changing temperature at sunset or sunrise. At the interface of the liquid, the temperature of the wall of the tank changes abruptly when the container is exposed to a temperature change. The temperature differential at that surface will be visually detectable by an abrupt change in color on the level gauge thereby indicating the liquid level in the container.

This simple, economical liquid level gauge obviates the need for complex auxiliary equipment or alteration of the container to accomodate the gauge. Particularly for sealed containers such as liquid gas tanks it eliminates sealing problems involved with presently known types of gauges. It is highly accurate, not susceptible to damage from shock and can be rapidly applied without tools. It has no moving part and requires no maintenance. In a preferred embodiment there are no electrical connections subject to shorting.

Although the invention is illustrated and described herein for monitoring the level of liquid gas in a pressurized tank, it should be understood that the invention is applicable to my opaque container where direct observation of the liquid level is not possible or practicable. Other applications include motor vehicle radiators, oil immersed transformers, circuit breakers and tank type oil immersed capacitor stacks. Coffee urns and grain storage installations are among other of the many varied applications of this invention.

The term "liquid" as used herein in accordance with the broader aspects of the invention include any fluidic substance capable of flowing such as a mass of solid comprising particles capable of flowing, seeking a level and offering no permanent resistance to change of shape. It includes any matter in which the shape of a given mass depends on the containing vessel but the volume is independent thereof.

The principal object of the present invention is to provide a simple economical direct reading, external liquid level gauge for determining the level of the liquid within a vessel.

Another object of the invention is to provide e a simple economical liquid level gauge which can be applied to a closed container without altering the container and without the use of tools or other auxiliary equipment.

A further and more specific object of the invention is to provide a sealed container having a direct reading external liquid level gauge which indicates the location of the surface of the liquid in the container by an abrupt color change in the gauge in response to an abrupt temperature change on the surface of the container at the interface of the liquid within.

A still further object of the invention is to provide a simple, economical method for direct reading external determination of the level of liquid within a closed container.

Other objects and advantages of the invention will be apparent from the following detailed description taken in connection with the accompanying drawings.

BRIEF DESCRIPTION OF THE DRAWINGS

FIG. 2 is a front elevational view, broken away, illustrating another embodiment of the invention;

FIG. 3 is a transverse sectional view taken on line III—III of FIG. 1; and

FIG. 4 is a view similar to FIG. 3 showing a cross section of the liquid crystal layer of the level gauge of the invention.

DETAILED DESCRIPTION OF THE PREFERRED EMBODIMENTS

Figure 1:
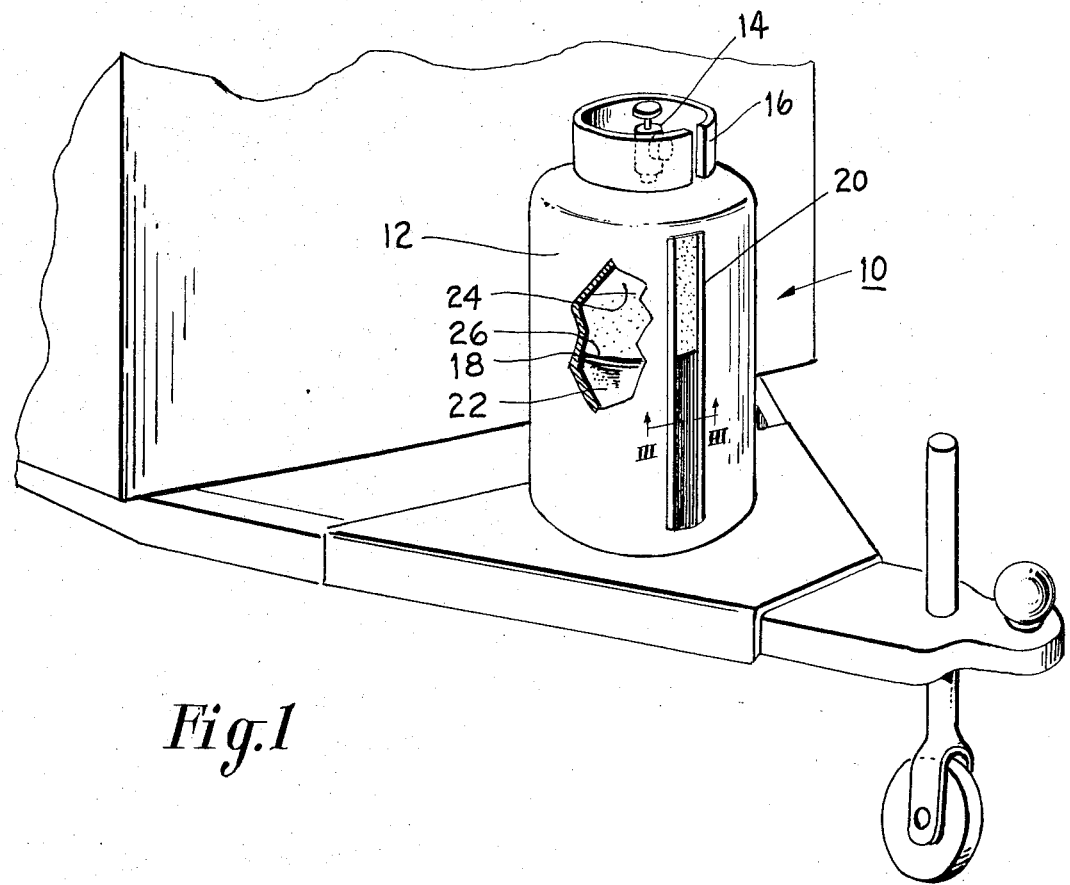
FIG. 1 is a fragmentary perspective view of a camping trailer incorporating one embodiment of the invention.

Referring to FIG. 1 a partial view of a camping trailer is shown having mounted on a front frame member thereof a tank 12 for storing liquid gas fuel; liquid propane is commonly used. The tank is of generally cylindrical shape having a shut-off and control valve 14 secured in the top wall thereof in sealed relationship to the tank. The valve 14 is utilized for controlling the flow of gas through a conduit (not shown) to the interior of the camping trailer where the propane gas is utilized in various appliances within the trailer as, for example, a cooking stove and/or a heating unit. A cylindrical guard wall 16 surrounds and protects the valve 14. Secured to the sidewall 18 of the tank 12 is a liquid level gauge or indicator 20 which may be secured in intimate heat transfer relationship in any suitable or desirable manner as, for example, by a pressure sensitive thermal conductive adhesive as shown. The liquid level gauge comprises an elongated strip of layered materials extending height-wise on the tank 12 and will be described in detail hereinafter. The liquid level gauge 20 is secured in intimate heat transfer relation to the outer surface of the wall 18. The tank is illustrated as being partially filled with liquid gas 22. The liquid 22 is in intimate contact with the interior surface of wall 18; gas vapor 24 is contained above the interface 26 of the liquid 22. When the tank 12 is exposed to a temperature change a temperature difference will result on the surface of tank 12 between the portion of the tank above the interface 26 and the portion of the tank below the interface 26; there will be an abrupt temperature change at the interface 26. This result is achieved by virtue of the fact that below interface 26 the liquid 22 is in intimate contact with the interior of the wall 18 and conducts heat away from the heated portion of the wall. Thus the wall is in effect cooled by the liquid and is lower in temperature below the interface 26 than it is above the interface 26. Above interface 26 the gas vapor 24 is in intimate contact with the interior of the wall 18; however, this medium does not conduct heat away from the wall as rapidly as the liquid. If the tank 12 is suddenly exposed to cooling, the temperature of the wall 18 below the interface 26 will cool more slowly than the portion of the wall above the interface 26 and, therefore, the wall 18 will be cooler in the section above the interface than below the interface 26.

The above explanation deals exclusively with an occasion in which the liquid or medium below interface 26 has a greater heat conductivity than does the medium above the interface 26. If the medium above the interface 26 has a greater heat conductivity than the medium therebelow the wall 18 will be at higher temperature in the portion below the interface upon heating the container.

The liquid level gauge is an elongate layered strip of material including a coating of cholesteric liquid crystal compound 28 (see FIG. 3.) spanning the interface 26. Thus the liquid crystal, being chromatically responsive to a temperature change as described herein above, will exhibit an abrupt change in color at the interface 26 where the wall of the tank experiences an abrupt change in temperature when the tank 12 is exposed to a temperature change.

The temperature change may be induced in a number of ways. For example, on a camping trailer where the tank is exposed to the sun there will be a temperature change at sunset and again at sunrise, at which time the level of the liquid within the container will be indicated by a changing color on the level gauge 20. If it is desired to read the liquid level at other times the tank 12 may be exposed to a temperature change by applying water, either warmer than the ambient temperature or colder than the ambient temperature, to the surface of wall 18 of tank 12 at the area at which the liquid level gauge 20 is affixed. The water may be either poured over this area or the area may be wiped with a dampened cloth. Another means for introducing a temperature change is to affix a heating element to the surface of the tank and to energize the electrical heating element when it is desired to read the level of the liquid within the container. This apparatus and method will be described herein with reference to the embodiment shown in FIG. 2. In some applications as, for example, oil immersed electrical equipment such as a transformer, a capacitor or a circuit breaker, the operation of the element itself will heat the liquid and the container will experience a temperature gradient due to this method of heating. In a motor vehicle, for example, when the engine is running the water within the radiator will be heated as it draws heat from the engine and when the engine is stopped there will be a difference in the rate of cooling above and below the interface of the radiator coolant.

The elongate strip 20 comprises a strip of plastic material 30 which may be decoratively colored as, for example, in chrome "Mylar" having a backing of pressure sensitive adhesive which must be a good heat conductor. Before application to the tank the "Mylar" layer 30 backed by pressure sensitive adhesive 32 may include a removable tissue coating to protect the adhesive. Secured to the surface of the "Mylar," remote from the adhesive backed surface, may be a cholesteric liquid crystal layer 28 secured thereto by a heat conducting adhesive 34. The liquid crystal layer 28 may comprise a base layer of polymeric film or other suitable plastic material coated with cholesteric liquid crystal material or a profusion of minute capsules 28a incorporated in or on the polymeric film. To enhance the optical properties of the liquid crystal layer a black or dark coating 28b may be utilized to cover the crystals. This may be ink, a black lacquer or other dark pigmented coating material. Thus the polymeric film 28' coated with liquid crystal material or encapsulated liquid crystals 28a and backed by a dark coating 28b form the liquid crystal layer 28.

It has been discovered that with certain applications where there is long and continuous exposure to ultraviolet radiation the cholesteric liquid crystal deteriorates and loses its temperature responsive chromatic characteristic necessary for the purpose of utilization as a liquid level gauge as herein described. This is particularly true in the illustrated example where a propane tank is mounted externally of a camping trailer and exposed to sunlight for long periods of time. To prevent this deterioration the liquid level gauge may include an additional layer over the layer 28 of liquid crystal in the form of an optically transparent ultraviolet filter layer 36. An example of a material that may be used for this purpose is "Tedlar," a product of E. I. duPont deNemours Co., Inc. and described in Bulletin PD-5, Mar. 1971. The most suitable of the variety of "Tedlar" film is "Tedlar" 100BG30UT which is 1 mil thick, ultraviolet opaque and transparent. This is a polyvinyl fluoride material.

Another embodiment of the invention is illustrated in FIG. 2 and by way of example is similarly shown for use on a liquid propane tank 12 similar to the propane tank of the FIG. 1 embodiment. In this embodiment an electrically energized heater 40 is provided which may be a strip of nichrome or similar high resistance electric heater element material. The heater element may be U-shaped in configuration, having legs 41 and 43 of the element extending heightwise of the container with the web of the element adjacent the top of the container and the free ends of the legs 41 and 43 being adjacent the lower end of the container 12. The heater 40 may be affixed to the container in any suitable manner wherein it is electrically insulated from the wall 18 thereof. Adhered to the container of the heating element 40 is a liquid level gauge 20 identical to the liquid level gauge described in relation to the FIG. 1 embodiment. Secured to the free ends of the legs 41 and 43 may be electrical conductors 42 and 44 respectively. Electrical conductors 42 and 44 may include terminal means for securing to a positive terminal 46 and negative terminal 48 respectively of a battery 50 or other suitable source of electrical energy. If desired the leads 42 and 44 may be permanently attached to the terminals 46 and 48 of battery 50 with a switch (not shown) in the circuit to control energization of the heating element 40. When it is desired to read the level gauge to determine the level of liquid within the tank 12 the heating element may be energized thereby heating wall 18 of tank 12. As described hereinabove the heat conduction rate above and below interface 26 of fluid 22 will be different, causing an abrupt temperature change at the interface 26. The liquid level gauge 20 having a coating of cholesteric liquid crystals will exhibit a chromatic response to the abrupt temperature change at the interface 26, thereby indicating the level of the liquid in the tank 12.

A simple, economical liquid level gauge has been described which can be applied to any existing container without the use of special tools or equipment and which requires no auxiliary equipment in one embodiment and merely an electrical energy source in another embodiment. It is a direct reading gauge not subjected to attack by corrosive materials within the tank and which may be readily removed and replaced. It provides a rapid response which can easily be read.

The unique method herein described is advantageous because of its economy and simplicity. A strip of temperature responsive cholesteric material which exhibits a chromatic change in response to a temperature change is affixed to the side of the container. Heat is applied either by natural change in ambient temperature of the environment, by applying heated or cooled liquid to the area surrounding the gauge, or by applying a heater to the area The result will be an indication by an abrupt color change at the interface of the liquid within the container.

A liquid level gauge and method for determining the liquid level within a container has been described for the purpose of illustration. It provides a substantial simplification and reduction in complexity and number of components required in comparison with previously known devices. Although the device has been described for use in a particular type of container it will of course be understood that in accordance with the broader aspects of the invention the liquid level gauge of this invention may be used with other and different types of containers and other and different materials within the container, including but not limited to flowable granular material as well as other liquids. It may be used with either sealed, closed or open containers.

Certain specific embodiments of the invention have been shown and described for the purpose of illustration but it will be apparent that various modifications and other embodiments are possible within the scope of the invention. It is to be understood therefore that the invention is not limited to the specific arrangement shown but in its broadest aspects it includes all equivalent embodiments and modifications which come within the scope of the invention.

What is claimed is:

1. A direct reading external liquid level gauge for measuring the contents level within a container comprising an elongate strip of material including a layer of base material, a thermochromatic layer, means for securing said elongate strip of material to a container in intimate thermal contact therewith.

2. A direct reading external liquid level gauge according to claim 1 wherein said thermochromatic layer includes a liquid crystal compound.

3. A direct reading external gauge according to claim 2 wherein said liquid crystal comprises cholesteral esters.

4. A direct reading external liquid level gauge according to claim 3 wherein said thermochromatic layer includes a light absorbing background.

5. A direct reading external gauge according to claim 2 wherein the mesomorphic range of said liquid crystal lies between 15° C and 50° C.

6. A liquid level gauge according to claim 1 including means for changing the temperature of the container.

7. A liquid level gauge according to claim 6 wherein said means for changing the temperature is disposed in the area adjacent the elongate strip of material.

8. An opaque container having a liquid level gauge secured thereto on its external surface in intimate thermal contact, said gauge comprising an elongate strip of material extending height-wise of the container and spanning the interface of the contents, said elongate strip comprising a base layer and layer containing cholesteric liquid crystals, said layer containing cholesteric liquid crystals having a backing of light absorbing material.

9. An opaque container according to claim 8 wherein a transparent ultra violet filter layer overlies said layer containing cholesteric liquid crystals.

10. An opaque container according to claim 8 including heater means for heating the surface of the container in the region of the liquid level gauge.

11. A method for determining the level of the contents of a container which comprises applying an elongate strip of thermochromatic material to a container in intimate thermal contact spanning the interface of the contents and exposing the container to a temperature change.

12. A method for determining the level of the contents of a container according to claim 11 wherein an electrically energized heater is applied to the container for inducing a temperature change in the region of the interface of the contents.

* * * * *